United States Patent
Ono

(10) Patent No.: US 6,305,604 B1
(45) Date of Patent: Oct. 23, 2001

(54) PRINTING APPARATUS, READING APPARATUS, AND PROCESSING SYSTEM FOR CHECKS

(75) Inventor: Hiroshi Ono, Shiejiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/275,665

(22) Filed: Mar. 24, 1999

(30) Foreign Application Priority Data

Mar. 26, 1998 (JP) .................................................. 10-079700

(51) Int. Cl.⁷ ...................................................... G06K 5/00
(52) U.S. Cl. ............................................. 235/380; 235/379
(58) Field of Search .................................... 735/379, 380, 735/375; 283/70

(56) References Cited

U.S. PATENT DOCUMENTS

| | | | |
|---|---|---|---|
| 4,027,142 | * 5/1977 | Paup et al. | 235/379 |
| 5,198,975 | 3/1993 | Baker et al. | |
| 5,491,325 | 2/1996 | Huang et al. | |
| 5,509,692 | * 4/1996 | Oz | 283/70 |
| 5,594,226 | 1/1997 | Steger | |
| 6,126,203 | * 10/2000 | Dwork et al. | 283/70 |

FOREIGN PATENT DOCUMENTS

0527639A2 * 2/1993 (EP).
62-97056 5/1987 (JP).

* cited by examiner

*Primary Examiner*—Karl D. Frech
(74) *Attorney, Agent, or Firm*—Michael T. Gabrik

(57) ABSTRACT

A check processing system that prints a payment amount on a personal check comprising a POS terminal installed at the shop where the check is tendered, and a symbol reading/MIC printing apparatus installed only at a processing facility. At the shop, the payment amount is input to the POS terminal where this amount is encoded and printed on the check with a two-dimensional symbol. The check is then sent to the processing facility after it is signed by the customer. Checks are processed all together at the processing facility. The symbol reading/MIC printing apparatus reads the payment amount from the two-dimensional symbol and prints that amount on the check with magnetic ink characters.

24 Claims, 5 Drawing Sheets

PRINTING APPARATUS, READING APPARATUS, AND PROCESSING SYSTEM FOR CHECKS

BACKGROUND OF THE INVENTION

1. Field of the Invention

The present invention relates to a check processing system, printing apparatus and a reading apparatus for the check processing system. More particularly, this invention is concerned with a printing apparatus for printing payment information on a check with a symbol such as a two-dimensional symbol, a reading/printing apparatus for reading the symbol and printing magnetic ink characters on a check, and a check processing system employing the apparatuses.

2. Description of the Related Art

In the United States and Europe, personal checks have been widely used as a means of payment. FIG. 1a shows an example of a form 101 widely adopted as such a personal check. On form 101, a date-of-issuance blank 102, a payee blank 103, a payment amount blank 104, and a signature blank 105 are defined. In the lower part 106 of the form 101, a bank number, account number, and check number are printed with magnetic ink characters (MIC).

With regard to an approach to printing magnetic ink characters in part 106, standards are already common place. The standard adopted mainly in the United States is the E13B standard, and the standard adopted in France is the CMC7 standard.

Using the information printed with magnetic ink characters in part 106, the validity of the check can be verified. A reading machine for reading magnetic ink characters is already being widely used. The reading machine is often referred to as an MICR (magnetic ink character recognition) reader.

A procedure which has previously been adopted to conduct business using such a personal check is described below.

(1) A consumer fills in the date, the payee, the payment amount, and his/her own signature on a check form like the one shown in FIG. 1a.

(2) The consumer hands the filled-in check (FIG. 1b) to an appropriate person at the payee's shop.

(3) At the shop, some transaction information is written on the check (usually on the back) in order to endorse it. This work is achieved by handwriting or by utilizing a stamp or slip printer.

(4) A receipt is handed to the consumer at the shop, and the check is sent to a processing facility.

(5) At the processing facility, a payment 107 is printed on the check with magnetic ink characters. The appearance of such a printed check is shown in FIG. 1c.

(6) The check is processed in accordance with a settlement system at a bank. The payment specified with magnetic ink characters is paid into the account of the payee (shop).

In the past, the task of printing payments on checks with magnetic ink characters has often been centralized in a processing facility (input center) for inputting the payment amount, or the like. This is because a printer capable of printing magnetic ink characters is so expensive that one is usually not installed at each cashier lane in each shop. As for the task itself, an operator in the processing facility visually reads the handwritten payment amount, enters the payment amount at a keyboard terminal so as to issue a command to a magnetic ink character printer to print the payment amount on the check with magnetic ink characters.

Thus, according to the above-mentioned procedure, a consumer handwrites a payment amount on a check, and an operator visually reads the payment amount. The operator then inputs that amount to a magnetic ink character printer using a keyboard. As a result, human errors are likely to occur. These errors are not only difficult to prevent but are also particularly problematic in that the amount to be paid is the most important of all the information on a check. Another problem is that this increases both the time required for the processing and the costs including personal expenses.

If a printer capable of printing magnetic ink characters in conformity with a typical standard could be installed at each cashier lane, a procedure could be adopted in which payment amounts are printed in advance with magnetic ink characters at the shop, and consumers are then asked to sign their names. In reality, however, since such a printer is very expensive, this procedure has problems in terms of cost.

SUMMARY OF THE INVENTION

It is therefore an object of the present invention to solve the above-identified problems.

It is a further object of the present invention to provide a check processing system that reduces the cost of processing business dealings, especially those where checks are used as a form of payment, and that also improves the speed and accuracy in processing.

Various aspects of the present invention for accomplishing the above objects are described below.

In accordance with one aspect of the present invention, a method of processing checks comprises following steps.

(a) encoding transaction data to a symbol;
(b) printing the symbol on a check;
(c) interpreting the symbol printed on the check in step (b), and reading the transaction data therefrom; and
(d) printing on the check with magnetic ink characters the transaction data read in step (c).

According to another aspect of the present invention, a check processing system is provided which comprises an encoder that encodes transaction data to a symbol; a symbol printing unit that prints on the check the symbol encoded by the encoder; a reader/interpreter that interprets the symbol printed on the check by the symbol printing unit, and reads the transaction data therefrom; and a MIC printing unit that prints on the check with magnetic ink characters the transaction data read by the reader/interpreter.

The encoder and the symbol printing unit are preferably incorporated in a recording apparatus (POS terminal) that is installed at each cashier lane. On the other hand, the reader/interpreter and the MIC printing unit are preferably incorporated in a printing apparatus (symbol reading/MIC printing apparatus) that is installed at a processing facility.

Transaction data, which includes a payment amount and may also include additional payment information, such as the shop name, address, date and shop account number, is input into the POS terminal via an input unit and encoded in a symbol format such as a two-dimensional symbol, and reliably recorded on a check in the symbol format by the POS terminal at each cashier lane.

The symbol printed on the check is decoded by the symbol reading/MIC printing apparatus to recover transaction data which can then be printed with magnetic ink characters, which are typical characters that have been employed in the past in dealings using a check. Therefore, human errors can be drastically reduced compared with the number typically made in conventional check processing. As a result, speed and accuracy in processing can be improved.

While a relatively inexpensive recording apparatus is installed at each cashier lane, the task of printing the transaction data with magnetic ink characters can be centralized in a processing facility. Consequently, a check processing system that has lower cost as a whole can be provided.

The recording apparatus (POS terminal) may further comprise a character printing unit that prints characters, which express the transaction data input by the input unit, on the check. The transaction data thus can be recorded with both a two-dimensional symbol and characters, and the contents of a check can therefore be recognized easily.

Moreover, the POS terminal may further comprise an endorsing unit that prints endorsements on the check. Because of this, when a payment is printed on a check, endorsement information can be printed at the same time. This saves a large amount of labor.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

[REFERENCE NUMERALS]

Figure 1A:
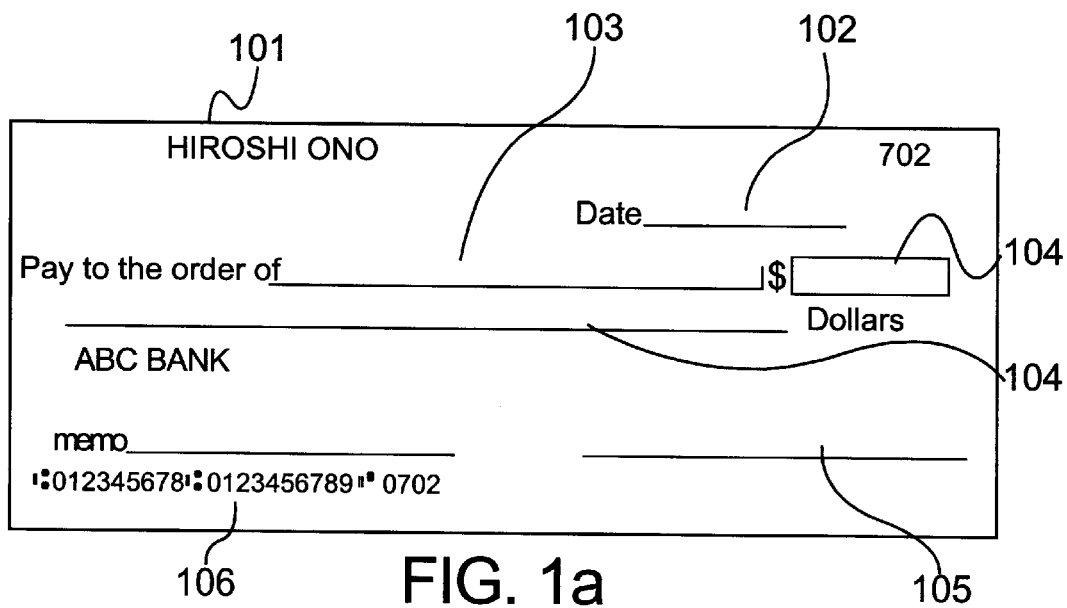
FIGS. 1a through 1c are explanatory diagrams showing appearances of a check processed according to a conventional technique.

101 check form
102 date of issuance
103 payee shop name
104 payment
105 signature
106 magnetic ink character printing area
107 payment amount printed with magnetic ink characters
301 two-dimensional symbol
401 POS terminal
402 input unit
403 two-dimensional symbol encoder
404 printing unit
405 clock
406 memory
501 symbol reading/MIC printing apparatus
502 two-dimensional symbol reading unit
503 magnetic ink character printing unit
504 carrying unit

DESCRIPTION OF THE PREFERRED EMBODIMENTS

Embodiments of the present invention are described below for the purpose of example and explanation. In light of this description taken in connection with the accompanying drawings, a person skilled in the art will be able to replace the elements of the embodiment with equivalents. Resultant embodiments are intended to be included in the scope of the present invention.

The present invention provides two apparatuses described below:

(a) An apparatus for printing amount-of-money information (i.e., payment amount) on a check with a two-dimensional symbol; and (b) An apparatus for recognizing the two-dimensional symbol and printing a recognized amount of money with magnetic ink characters.

What is referred to as a two-dimensional symbol is a so-called two-dimensional bar code. Compared with a one-dimensional bar code widely adopted in physical distribution fields, the two-dimensional bar code enables recording of a large amount of data at a high density. The possibility that data can be restored despite smear or breakage is high. The two-dimensional bar code also has such a feature that reading can be achieved in various directions. The International Organization for Standardization is currently proceeding with standardization of the two-dimensional bar code.

Printing a two-dimensional symbol itself can be achieved by a low-price/low-cost printer. For example, an ink jet printer, a thermal transfer printer, a laser printer, or an impact wire dot printer can be used for printing a two-dimensional symbol.

Consequently, the apparatus for printing amount-of-money information on a check with a two-dimensional symbol can be realized relatively inexpensively and installed at each cashier lane. Moreover, providing the apparatus with the capability of a slip printer or the like for endorsing a check would be an added convenience for the shop where the apparatus is installed. This apparatus shall be referred to as a "POS terminal."

On the other hand, the apparatus for recognizing the two-dimensional symbol and printing the amount-of-money information with magnetic ink characters is provided for doing certain work that in the past has been done at a processing facility, input center or the like. Printing magnetic ink characters cannot be performed by any printer other than an expensive printer. According to the present invention, such a machine need not be installed at each cashier lane. If shops are franchised as a franchised chain, only several machines would need to be installed as a whole according to the scale of the franchised chain. Hereinafter, this apparatus shall be referred to as a "symbol reading/MIC printing apparatus."

A typical procedure of conducting business with a check, which is followed by employing the above-mentioned apparatuses, will be described with reference to the flowchart of FIG. 2 and the examples of checks in FIG. 1 and FIG. 3.

Figure 1B:
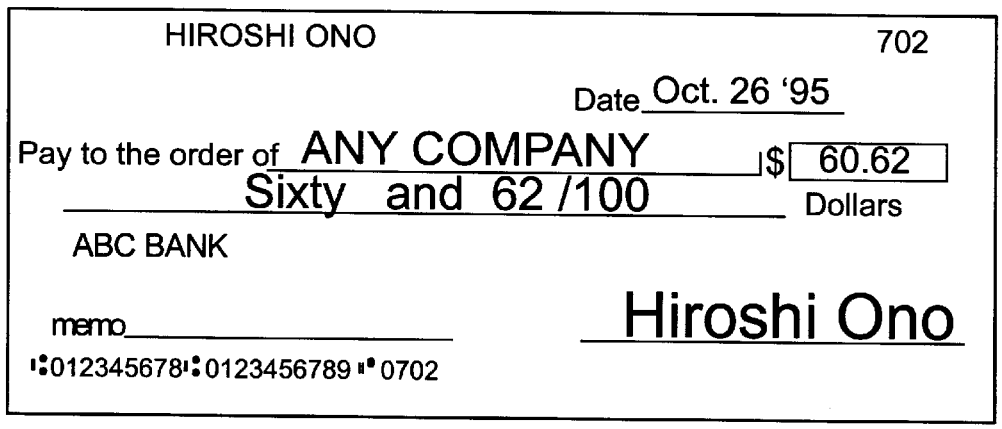
Figure 1C:
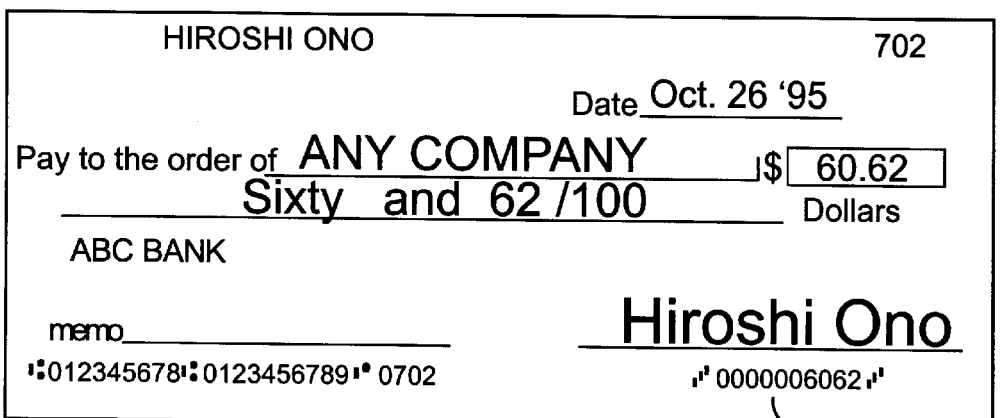
Figure 2:
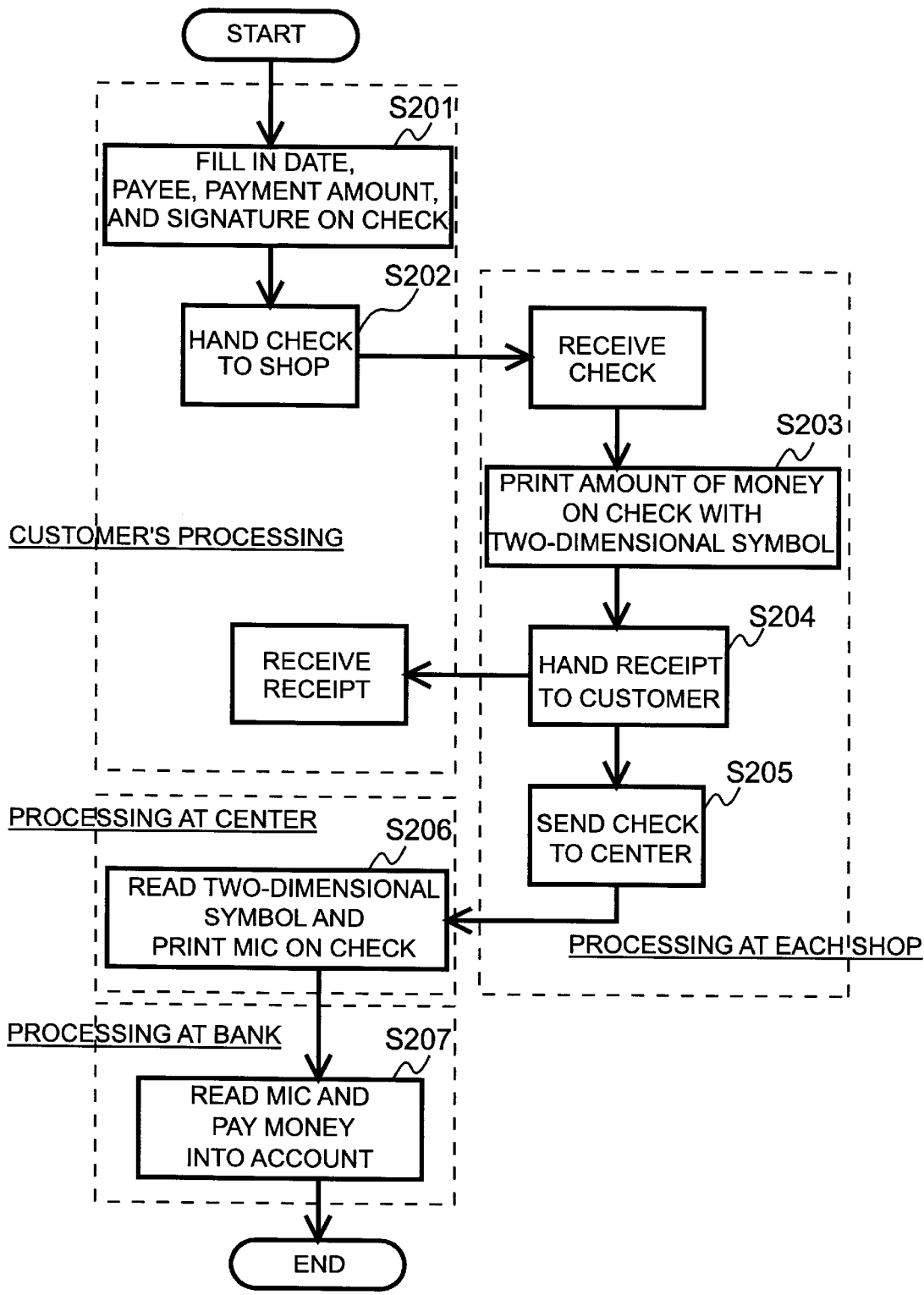
FIG. 2 is a flow chart describing a procedure of conducting business with, and processing, a check according to the present invention.

(1) A consumer fills in the date, the payee, the payment amount, and his/her own signature on a check form like the one shown in FIG. 1a (S201).

(2) The consumer hands the filled-in check (FIG. 1b) to an appropriate person at the payee's shop (S202).

Figure 3A:
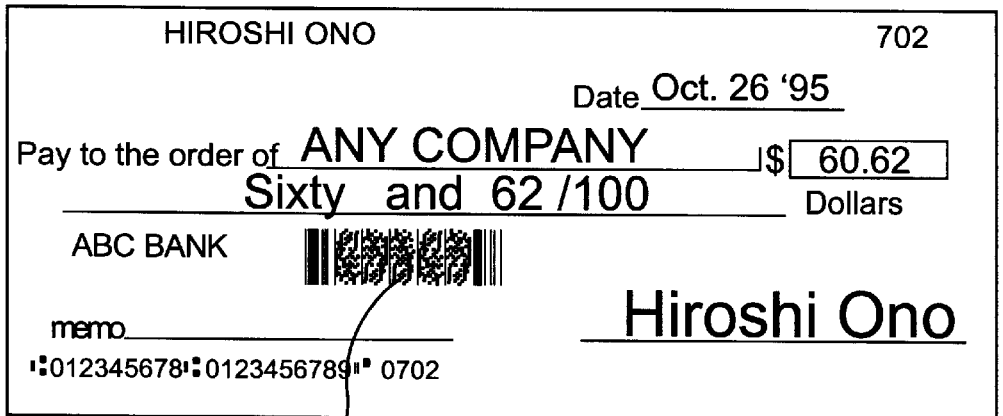
FIGS. 3a and 3b are explanatory diagrams showing appearances of a check processed according to the present invention.

(3) At the shop, the POS terminal is used to print a two-dimensional symbol 301 representing amount-of-money information (S203). The appearance of the printed check is shown in FIG. 3a. At the same time, the check can be endorsed using the POS terminal.

(4) A receipt is handed to the consumer at the shop (S204).

(5) The check is sent to a processing facility or input center (S205).

Figure 3B:
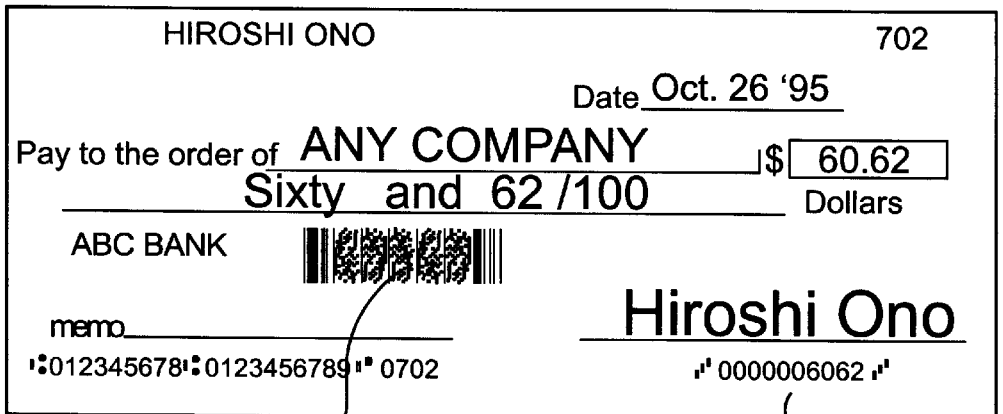

(6) At the processing facility (or input center), the two-dimensional symbol 301 on the check is read and decoded, and the decoded characters are interpreted as a payment. The payment is written on the check with magnetic ink characters 107 (S206). The appearance of the written check is shown in FIG. 3b.

(7) The check is sent to a bank. The payment specified with the magnetic ink characters is paid into an account of the payee (S207).

Incidentally, in the above example, the consumer handwrites the date, the payee, and the payment amount. When the POS terminal is provided with a facility for printing these items of information, the procedure described below may be adopted instead of the procedure of steps (1) to (4). In this case, human errors can be even more reliably prevented.

(1) A consumer hands a check form, on which nothing is written as shown in FIG. 1a, at a shop.

(2) At the shop, the POS terminal is used to print amount-of-money information on the check with a two-dimensional symbol and to concurrently print the date, the payee, and the payment amount with characters readable by the consumer.

(3) The printed check is presented to the consumer. The consumer is asked to check the contents and to sign his/her name.

(4) The consumer hands the signed check at the shop. A receipt is in turn handed to the consumer.

Figure 4:
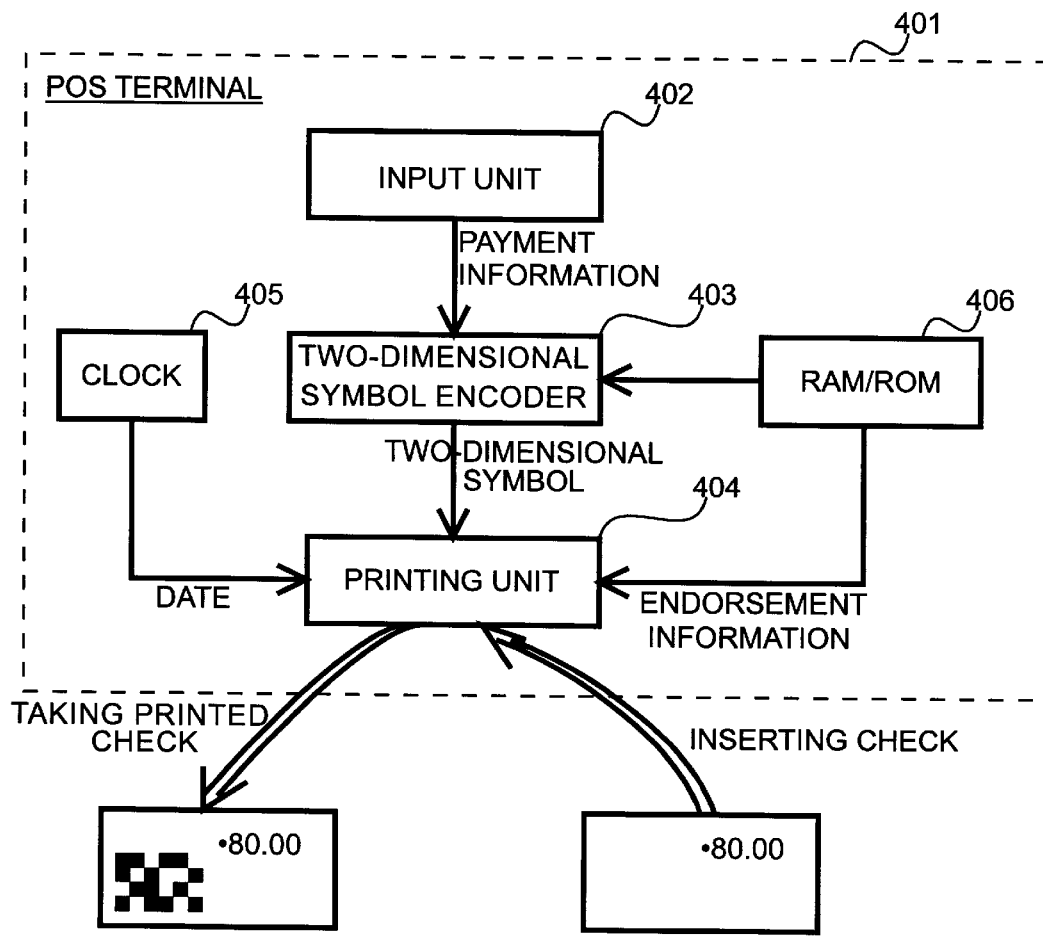
FIG. 4 is a block diagram showing the configuration of an embodiment of a POS terminal in accordance with the present invention.

Now, the configuration of the embodiment of the POS terminal will be described with reference to FIG. 4.

A POS terminal 401 is provided with an input unit 402 for inputting a payment amount. As the input unit 402, for example, an input unit having a tenkey pad that is employed in a cash register or electronic desktop calculator can be used. Moreover, a general-purpose personal computer may be used as an input unit. In this case, a keyboard, a mouse, or a touch panel with a liquid crystal display is used to enter a payment amount at the shop.

A two-dimensional symbol encoder 403 produces a two-dimensional symbol indicative of the payment amount and any other transaction data input by the input unit 402. For encoding the input to a two-dimensional symbol, a known technique can be utilized. This portion can therefore be realized by utilizing a very simple computer or dedicated electronic circuit. For example, a unit provided with a ROM, in which the definitions of two-dimensional symbols themselves are stored, and a CPU for storing a two-dimensional symbol in a RAM according to the contents of the ROM and an input amount of money can be employed.

A printing unit 404 prints an encoded two-dimensional symbol on a check form. Furthermore, when the printing unit 404 is designed to be able to print information including the date and payee which is written in order to endorse the check, labor can be saved in handling the check. At the same time, human errors can be prevented. For updating the date, a clock 405 is incorporated in the POS terminal. The shop name and endorsement information are stored in advance in a memory 406 such as a RAM or ROM.

Thus, by using the POS terminal 401 having the foregoing components, a two-dimensional symbol encoding the payment amount is printed on the check. The two-dimensional symbol is printed in a memorandum blank or the like on the check. Moreover, the information encoded by the two-dimensional symbol need not be limited to the payment amount but may include other transaction data, such as the shop name, cashier lane number, address, date, and account number for a shop.

Figure 5:
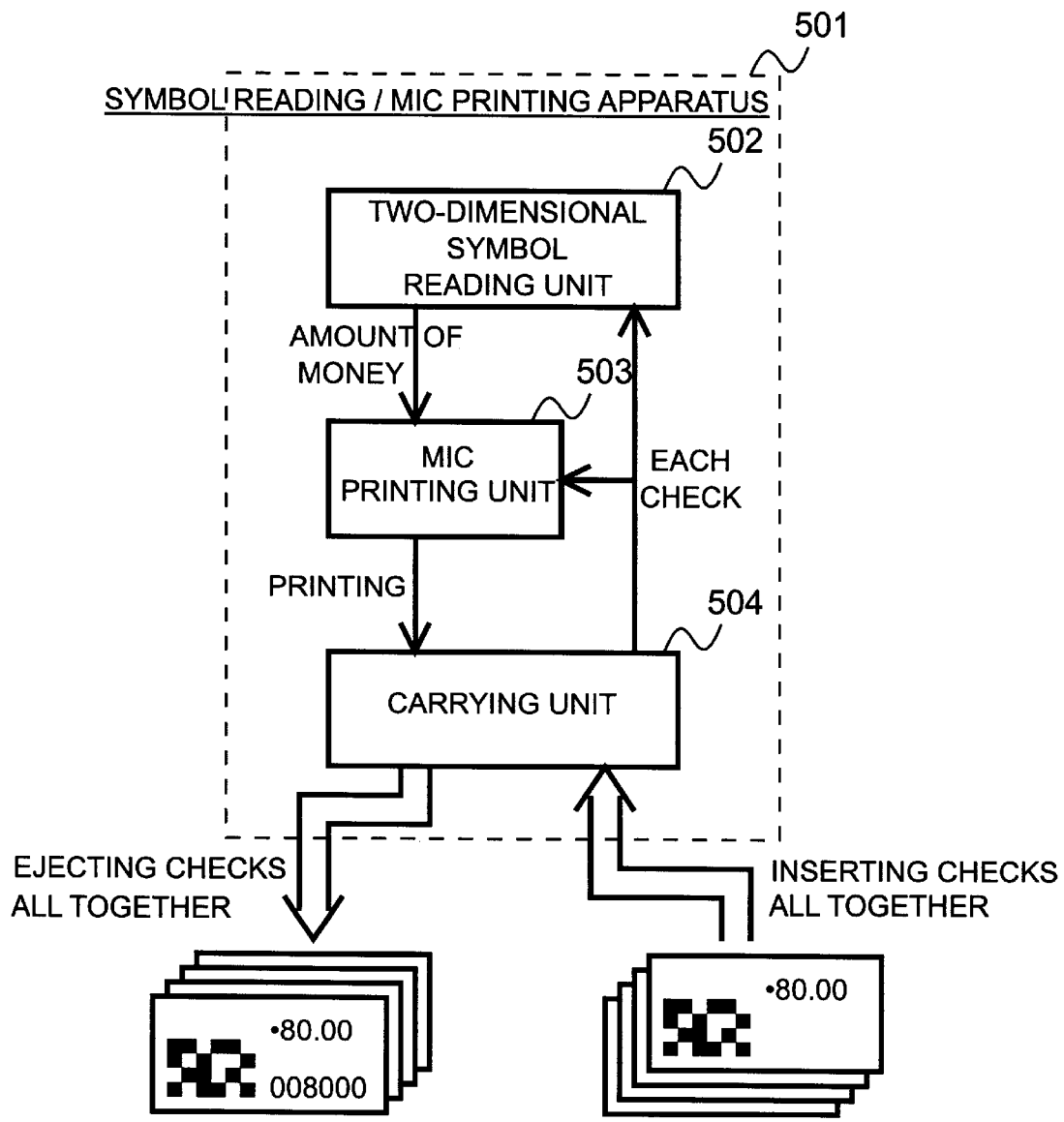
FIG. 5 is a block diagram showing the configuration of an embodiment of a symbol reading/MIC printing apparatus in accordance with the present invention.

On the other hand, according to a check processing procedure that has already been adopted, amount-of-money information must also be printed on the check with magnetic ink characters. The symbol reading/MIC printing apparatus carries out this processing. Referring to FIG. 5, this apparatus is described below.

The symbol reading/MIC printing apparatus 501 includes a two-dimensional symbol reading unit 502 for reading and decoding a two-dimensional symbol printed on a check. As the two-dimensional symbol reading unit 502, a known reading unit can be used. Moreover, a scanner and computer may be used in combination, and software for decoding a two-dimensional symbol may be installed. Thus, the two-dimensional symbol reading unit may be realized in a number of ways.

A magnetic ink character printing unit 503 prints the decoded amount-of-money information on a check with magnetic ink characters. A printer for printing magnetic ink characters, which has been adopted in the past, can be used.

Unlike a conventional check processing procedure in which a human operator manually enters the amount-of-money, according to the present invention, the amount-of-money is read by the reading unit 502, inputted to the printing unit 503 and printed. Consequently, human errors such as incorrectly inputting or recognizing the amount of money can be prevented.

Using a two-dimensional symbol to encode transaction data enables recording a large amount of data at a high density. Moreover, the two-dimensional symbol offers an excellent error correcting feature against smear or breakage, and is therefore suitable for recording information that is required to be accurate such as a payment amount or amount-of-money information.

A carrying unit 504 enables a plurality of checks to be processed successively by the reading unit 502 and the printing unit 503. According to the present invention, printing amount-of-money information with magnetic ink characters is often centralized in a processing facility or the like. Numerous checks or batches of checks must be capable of being processed all together. For this purpose, a known check carrying mechanism can be used. A mechanism similar to a mechanism for loading and ejecting forms, which is employed in a copying machine or ordinary printer, can be employed.

On a check processed by the symbol reading/MIC printing apparatus 501, a bank name, a branch name, an account number, a check number, and an amount of money are written with magnetic ink characters according to a check settlement standard that has been adopted in the past. For example, at a bank processing can be carried out in the same manner as conventional check settlement procedure.

Moreover, an account number for a shop may be recorded in a two-dimensional symbol. In this case, the account number can be used instead of information that is conventionally obtained through endorsement. This permits further automation.

If only the amount-of-money is recorded in a symbol, instead of the two-dimensional symbol, a one-dimensional bar code may be used for the above-mentioned check processing system.

Furthermore, a program of instructions for implementing the foregoing processing in the POS terminal 401 and symbol reading/MIC printing apparatus 501 can be recorded on a variety of machine readable medium including, for example, a disk, magnetic tape, or optical medium. The POS terminal 401 can be realized with a typical computer or printer, and the program recorded on the machine readable medium may be loaded into the computer or printer. By implementing the processing according to the present invention in this manner, each apparatus can be maintained, managed, or refreshed easily. Moreover, a quite inexpensive POS terminal 401 can be realized.

As described so far, according to the present invention, a payment amount is recorded on a check with a two-dimensional symbol at a shop where the check is tendered. At a processing facility, the two-dimensional symbol is then read mechanically to recover the payment amount which is then printed on the check using magnetic ink characters. Thus, magnetic ink characters that are conventionally employed, can be printed on a check without the need for a human to reenter the data. As a result, human errors can be reduced drastically compared with the amount conventionally made. Speed and accuracy in processing can be improved. Moreover, as the foregoing demonstrates, the present invention can be used in connection with present personal check settlement procedures. Thus, the cost of an entire check processing system can be reduced to a low amount.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A check processing system, comprising:

an encoder that encodes transaction data to a symbol;

a symbol printing unit that prints on a check the symbol encoded by the encoder;

a reader/interpreter that interprets the symbol printed on the check by the symbol printing unit, and reads the transaction data therefrom; and a magnetic ink character printing unit that prints on the check with magnetic ink characters the transaction data read by the reader/interpreter;

wherein the reader/interpreter and the magnetic ink character printing unit are physically located in a first location and the encoder and symbol printing unit are physically located in a second location remote from the first location.

2. A check processing system according to claim 1, wherein the symbol is a two-dimensional symbol.

3. A check processing system according to claim 1, wherein the transaction data comprises at least a payment amount.

4. A check processing system according to claim 1, wherein the encoder and symbol printing unit are incorporated in a point-of-sale terminal.

5. A recording apparatus for recording transaction data on a check, the transaction data including at least a payment amount, the recording apparatus comprising:

an input unit for inputting the transaction data;

an encoder that encodes the transaction data to a symbol; and a symbol printing unit that prints on the check the symbol encoded by the encoder such that a reader/interpreter can interpret the symbol and read therefrom the transaction data;

wherein the input unit, the encoder, and the symbol printing unit are incorporated in a point-of-sale terminal.

6. A recording apparatus according to claim 5, further comprising a character printing unit that prints characters on the check indicative of the transaction data input by the input unit.

7. A recording apparatus according to claim 5, further comprising an endorsing unit that prints endorsement information on the check.

8. A recording apparatus according to claim 5, wherein the symbol is a two-dimensional symbol.

9. A method of processing a check, comprising the steps of:

(a) encoding transaction data to a symbol;

(b) printing the symbol on the check;

(c) interpreting the symbol printed on the check in step (b), and reading the transaction data therefrom; and (d) printing on the check with magnetic ink characters the transaction data read in step (c);

wherein steps (c) and (d) are performed at a first location and steps (a) and (b) are performed at a second location remote from the first location.

10. A method of processing a check according to claim 9, wherein the symbol is a two-dimensional symbol.

11. A method of processing a check according to claim 9, wherein the transaction data comprises at least a payment amount.

12. A method of processing a check according to claim 9, wherein characters indicative of the transaction data are also printed on the check in step (b).

13. A method of processing a check according to claim 9, wherein endorsement information is also printed on the check in step (b).

14. A method of recording information on a check, comprising the steps of:

(a) inputting transaction data including at least a payment amount;

(b) encoding the transaction data to a symbol; and (c) printing on a check the symbol encoded by the encoder such that the symbol can be interpreted and the transaction data read therefrom;

wherein steps (a), (b) and (c) are performed in a single point-of-sale terminal.

15. A method of recording information on a check according to claim 14, wherein the symbol is a two-dimensional symbol.

16. A machine readable medium embodying a program of instructions for execution by a machine to perform a method of processing a check, the method comprising the steps of:

(a) encoding transaction data to a symbol;

(b) printing the symbol on a check;

(c) interpreting the symbol printed on the check in step (b), and reading the transaction data therefrom; and (d) printing on the check with magnetic ink characters the transaction data read in step (c);

wherein steps (c) and (d) are performed at a first location and steps (a) and (b) are performed at a second location remote from the first location.

17. A machine readable medium according to claim 16, wherein the symbol is a two-dimensional symbol.

18. A machine readable medium according to claim 16, wherein the transaction data comprises at least a payment amount.

19. A machine readable medium according to claim 16, wherein characters indicative of the transaction data are also printed on the check in step (b).

20. A machine readable medium according to claim 16, wherein endorsement information is also printed on the check in step (b).

21. A machine readable medium embodying a program of instructions for execution by a machine to perform a method of recording information on a check, the method comprising the steps of:

(a) inputting transaction data including at least a payment amount;

(b) encoding the transaction data to a symbol; and (c) printing on a check the symbol encoded by the encoder such that the symbol can be interpreted and the transaction data read therefrom;

wherein steps (a), (b) and (c) are performed in a single point-of-sale terminal.

22. A machine readable medium according to claim 21, wherein the symbol is a two-dimensional symbol.

23. A check processing system, comprising:

means for encoding transaction data to a symbol;

means for printing on a check the symbol encoded by the encoding means;

means for interpreting the symbol printed on the check by the symbol printing means, and for reading the transaction data from the symbol; and means for printing on the check with magnetic ink characters the transaction data read by the interpreting/reading means;

wherein the reading and interpreting means and the magnetic ink character printing means are physically located in a first location and encoding means and the symbol printing means are physically located in a second location remote from the first location.

24. A check processing system according to claim 23, wherein the encoding means and the symbol printing means are incorporated in a point-of-sale terminal.

* * * * *